(12) United States Patent
Lönngren

(10) Patent No.: US 6,935,907 B2
(45) Date of Patent: Aug. 30, 2005

(54) POD UNIT

(75) Inventor: Stig Lönngren, Kristinehamn (SE)

(73) Assignee: Rolls-Royce Aktiebolag, Kristinehamn (SE)

( * ) Notice: Subject to any disclaimer, the term of this patent is extended or adjusted under 35 U.S.C. 154(b) by 76 days.

(21) Appl. No.: 10/801,590

(22) Filed: Mar. 17, 2004

(65) Prior Publication Data
US 2004/0175998 A1 Sep. 9, 2004

Related U.S. Application Data

(63) Continuation of application No. 10/258,121, filed as application No. PCT/SE01/00842 on Apr. 18, 2001, now Pat. No. 6,783,409.

(51) Int. Cl.⁷ .............................................. B63H 20/12
(52) U.S. Cl. ................................ 440/6; 440/58; 440/60
(58) Field of Search ............................... 440/6, 43, 58, 440/60, 79

(56) References Cited

U.S. PATENT DOCUMENTS 5,403,216 A  4/1995  Salmi et al. .................... 440/6
6,165,031 A  12/2000  Lonngren et al. ............. 440/51

FOREIGN PATENT DOCUMENTS

EP  0 590 867  4/1994
JP  11278379 A  10/1999

OTHER PUBLICATIONS

English Language Abstract of JP 11278379.
Copy of International Search Report.
Copy of International Preliminary Examination Report.

Primary Examiner—Sherman Basinger
(74) Attorney, Agent, or Firm—Michael Bednarek Shaw Pittman LLP

(57) ABSTRACT

A pod unit including a pod housing (1) and an assembly unit (6), a so called seating, for the pod housing (1), wherein the seating (6) has a lower portion (6A) and an upper portion (6F) as well as a base (15) for the installation of the pod housing (1) which comprises a lower casing portion (1A) for the accommodation of a propulsion unit (2, 3, 4), an intermediate portion (1B) comprising air ducts (9, 10), and an upper portion (13), which is fixedly connected to a steering engine (14, 18, 19), with a gear ring (14) to be fixed at the base (15). A cooling system having at least one fan (7) is mounted within the seating.

6 Claims, 8 Drawing Sheets

POD UNIT

This application is a continuation of U.S. patent application Ser. No. 10/258,121 filed Oct. 21, 2002, now U.S. Pat. No. 6,783,409, which is a 371 of PCT/SE01/00842, filed Apr. 18, 2001.

TECHNICAL FIELD

The present invention relates to a pod unit comprising a pod housing with a steering engine, a fan system, a slip-ring device, and an assembly unit, so called seating, for the pod housing, the seating being a portion of the hull bottom and comprising a base for the mounting of said pod housing, which comprises a lower casing portion intended to accommodate a propulsion unit, an intermediate portion comprising air ducts and an upper portion, which is fixedly connected to a steering engine having a gear ring to be fixed at said base.

TECHNICAL FIELD

The pod system has become a more and more common alternative for the propulsion of marine vessels. The advantages as compared with conventional systems are: shorter time of installation; possibilities of simpler and more flexible maintenance as well as possibilities of a quick exchange of the entire propulsion unit. Known pod systems, however, show certain drawbacks. Such a drawback is that the delivery unit/module for the pod system itself and the fan system for cooling of the pod engine according to the technique known today is divided, which may imply certain complications in connection with the assembly, as both these systems must be carefully adapted to each other and mounted in a special sequence. According to known technique, the seating is first welded to the hull, and then the steering engine can be mounted. Thereafter, the pod housing may be mounted and only thereafter the slip-ring device and the fan system may be mounted. Further, the fan system according to known technique is mounted at a level above the hull bottom, which implies that the cooling effect from the water against the hull bottom cannot be utilized. It is realised that a better cooling effect of the air should lead to savings in the form of less power requirements for the cooling.

Another essential drawback with today's pod systems is the comparatively high costs. These costs depend among other things on the plurality of components as well as the comparatively bulky installation requirements of the system. The assembly can often be comparatively complicated because of the fact that great accuracy is required for the installation of the pod unit at the hull. The rotatable portion of the pod unit is provided in a box-shaped assembly unit, a so called "seating", which consists of a module element which is welded to the hull and which also aims at transmitting the cargo from the pod housing to the hull. There is a risk that said seating, because of the welding, may buckle, which in turn implies that a machining of the base for the installation of the pod unit must be made. Such subsequent machining is complicated and expensive and therefore not desirable.

Additionally, today a steering cone, which is provided through the seating, is used for the steering of the rotation of the pod unit, which in itself is an expensive construction.

BRIEF DISCLOSURE OF THE INVENTION

The object of the present invention is to eliminate or at least to minimize at least some of the above mentioned problems, which is achieved by a cooling system comprising at least one fan mounted within the seating.

With this solution, a pod system is obtained, wherein the pod housing with the steering engine is a delivery unit, which is compact, has a low building height and implies a lower cost than conventional systems. Due to the fact that the seating with the cooling equipment and the pod housing with the steering engine can be delivered as controlled and tested units a simpler, cheaper and safer installation with the shipyards is obtained. Further advantages of the invention according to the preferred embodiment are that a better cooling efficiency is obtained, as the air flow runs in the seating with direct contact with the plates adjacent to the water.

According to further aspects:

- the upper edge (14B) of said gear ring (14) is provided near the lower portion (6A) of the seating, the distance between said upper edge (14B) and the shortest distance (X) to the imaginary hull line (L) of the seating being below 900 mm;
- at least one cooling unit is installed within said seating;
- a drum (29), which is installed inside the seating and which is preferably provided coaxially to and above said base (15), has an inlet opening (23) and an outlet opening (22), respectively, for cooling air;
- the seating (6) comprises side walls (6B, 6C, 6D, 6E), and stays (21) provided with holes (21A) are arranged between said drum (29) and said side walls (6B–6E), said stays transmitting cargo and also enabling transport of air;
- an assembly flange (16) intended to connect said base (15) to a bearing socket (19) for the gear ring (14) which is intended to be connected to the upper portion (4C) of the pod housing;
- said gear ring (14) is arranged with the cogs on the inside thereof:
- a base is provided nearer the lower portion (6A) of the seating than the upper portion (6F) of the seating; and
- said distance (X) is between 0.1 and 0.2× the diameter (D) of the gear ring (14).

BRIEF DISCRIPTION OF DRAWINGS

Below, the invention will be described more in detail with reference to the accompanying drawings, of which FIG. 1 is a longitudinal cross section of a pod unit according to prior art installed in a ship hull;

DETAILED DESCRIPTION

Figure 1:
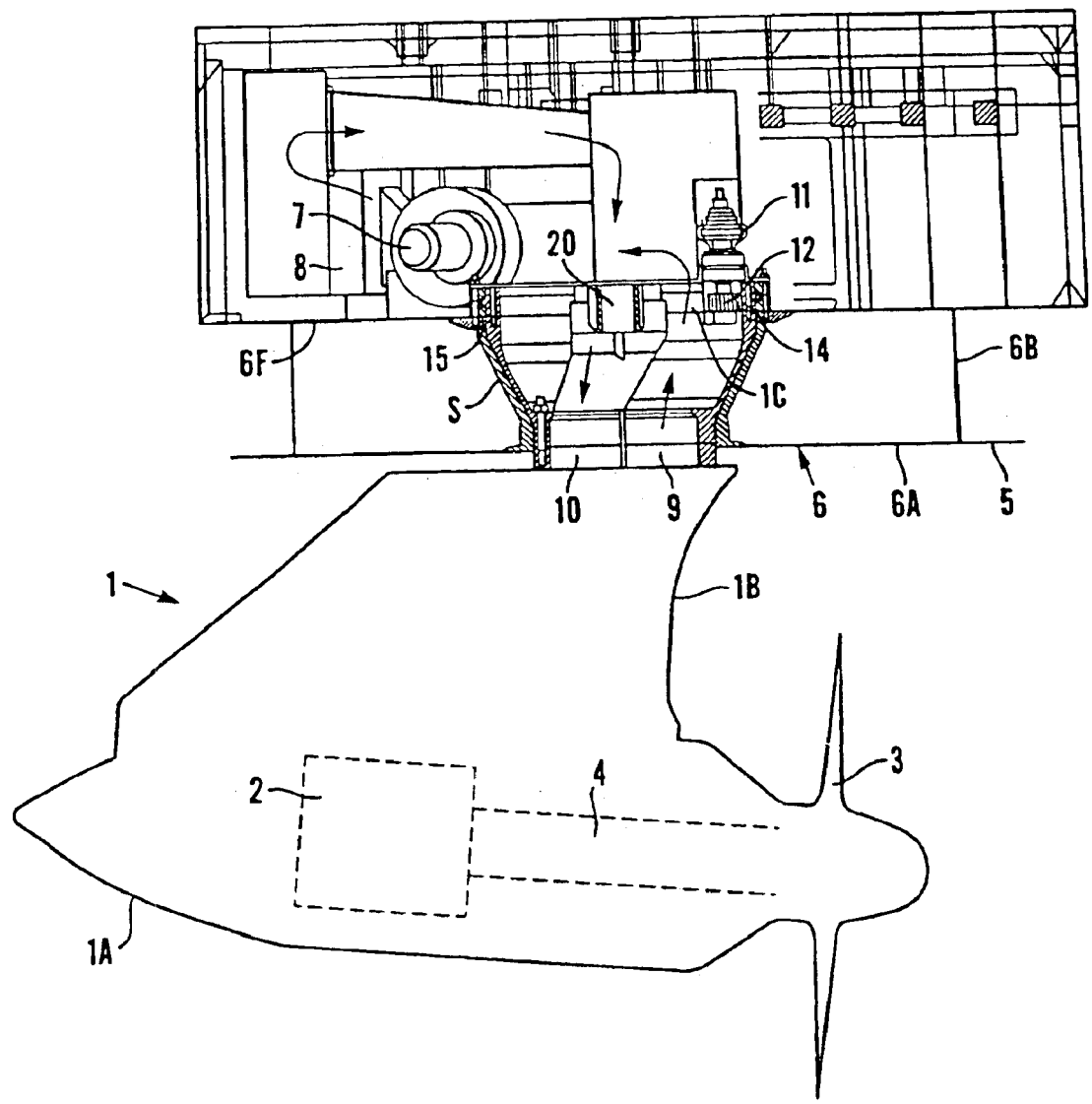

In FIG. 1 there is shown a previously known pod unit 1, which is installed at a ship hull 5 with double bottoms according to prior art. As can be seen, the pod housing 1 comprises a lower casing portion 1A for the provision of an motor unit 2 with a shaft 4, at which the propeller 3 is arranged. Above the casing portion 1A there is an intermediate portion 1B, which forms a rudder portion and accommodates a number of ducts, for instance for the provision of the power supply to the motor unit 2. Further, there are air ducts for cooling air. At the top of and adjacent to said intermediate portion 1B there is a steering engine with a steering cone S for the provision of the rotatable pod housing 3 inside a corresponding cone-shaped portion of the seating 6. Said seating 6 is an installation module which generally has a rectangular shape and then with four side walls 6B–6E, which connects to a corresponding recess in the hull 5 for welding to the hull. The seating 6 is thus a separate module which is delivered to shipyards for installation. The upper portion of the steering cone S is fixedly connected to a gear ring/turning ring 14 generally having a diameter above 2.5 m. which gear rind is caused to rotate by means of a cog wheel 12 in an motor unit 11, usually a hydraulic motor. The gear ring 14 is provided in a bearing unit 19, which is attached to a base 15, which is fixedly secured in the upper portion of the seating 6, which portion essentially consists of a plate 6F included in the interior of the double bottoms of the hull. The distance between the inner 6F and the outer 6A plate generally exceeds 1.5 m. The upper plate 6F often constitutes a portion of the floor board, i.e. the walking space for persons. By means of a slip-ring device 20, which is provided centrally at the top of the pod housing, the motor unit 2 is fed with power through a connection unit 32 (see FIG. 2). The motor 2 is cooled by means of fans 7, which pushes cooling air through the cooling element 8, and then air passes down through a duct 10 in the pod housing and after cooling of the motor 2 the air is returned upwards through a return duct 9 in the pod housing and then re-circulated to the fan 7. As can be seen from the figure, a fan arrangement with a cooling unit according to prior art is not included in the module unit constituting the very seating.

Figure 2:
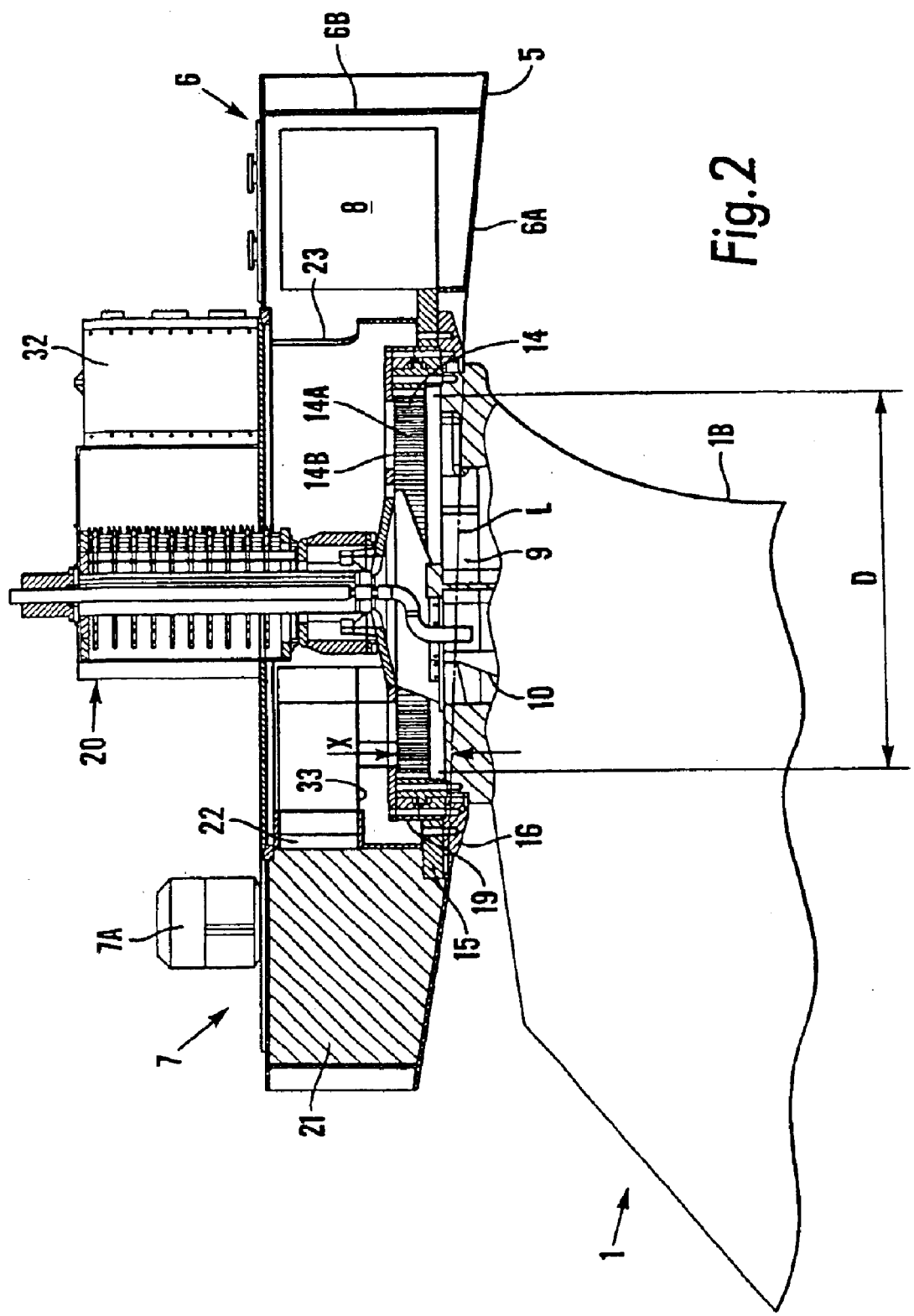
FIG. 2 shows in a longitudinal cross section essential details of a pod unit according to the invention.

In FIG. 2 there is shown a preferred embodiment of a pod arrangement according to the invention. To a great extent, this embodiment corresponds to a conventional embodiment as described with reference to FIG. 1. Thus, focus will only be put on essential amendments which have been done in the embodiment according to the invention. Like as shown in FIG. 1, there is a seating 6 with a rectangular bottom surface 6A, which constitutes part of the hull bottom, and side walls 6B–6E, which form a kind of a box unit. Inside said box unit, two fans 7 as well as two cooling devices 8 are provided. Further, there is shown that the base 15 intended for the installation of the pod unit 1 is provided at the lower edge of the seating 6, i.e. near the hull bottom (contrary to the upper edge according to prior art). According to the preferred embodiment, the base 15 is placed such that the distance X between the upper surface 14B of the gear ring 14 and the shortest distance to the imaginary hull line of the seating is between 0.10 and 0.20 times the diameter D of the gear ring, but below 900 mm. Another difference is that a mounting flange 16 is provided between the base 15 and the bearing socket 19 for the gear ring 14, which is clearer in FIG. 3.

Figure 3:
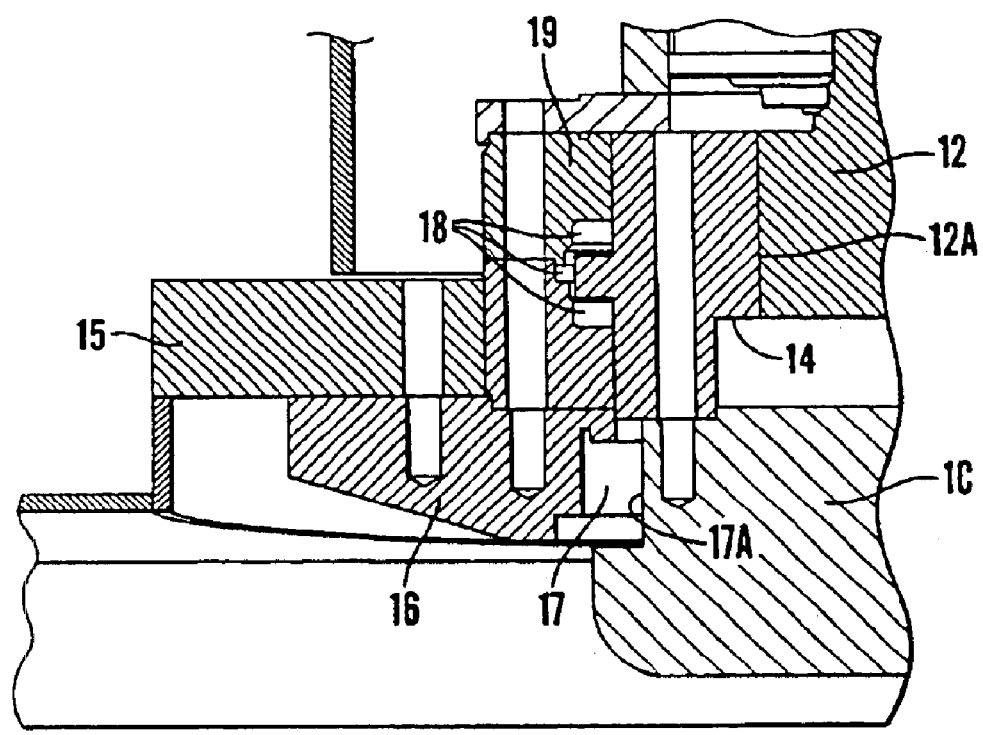
FIG. 3 is a view more in detail of the attachment of the pod housing at the seating.

FIG. 3 is a detailed, cross-sectional view showing the mounting of the upper portion 1C of the pod housing at the seating 6. It can be seen that the base 15, which is welded to the seating 6, is provided at its lower edge. An mounting flange 16 is attached in the base with bolts, which flange in its turn is connected to a bearing socket 19. The bearing socket 19 is divided into an upper and a lower portion to accommodate upper, lower and outer bearing rolls 18 to the gear ring 14. At the inner circumference of the gear ring cogs 14A are arranged, which co-acts with cogs 12A of a cog-wheel 12, which is provided at the motor 11 driving the gear ring 14. Further, there is shown that a sealing 17 is provided in the circular recess 17A between the upper portion 1C of the pod housing and the mounting flange 16.

Figure 4:
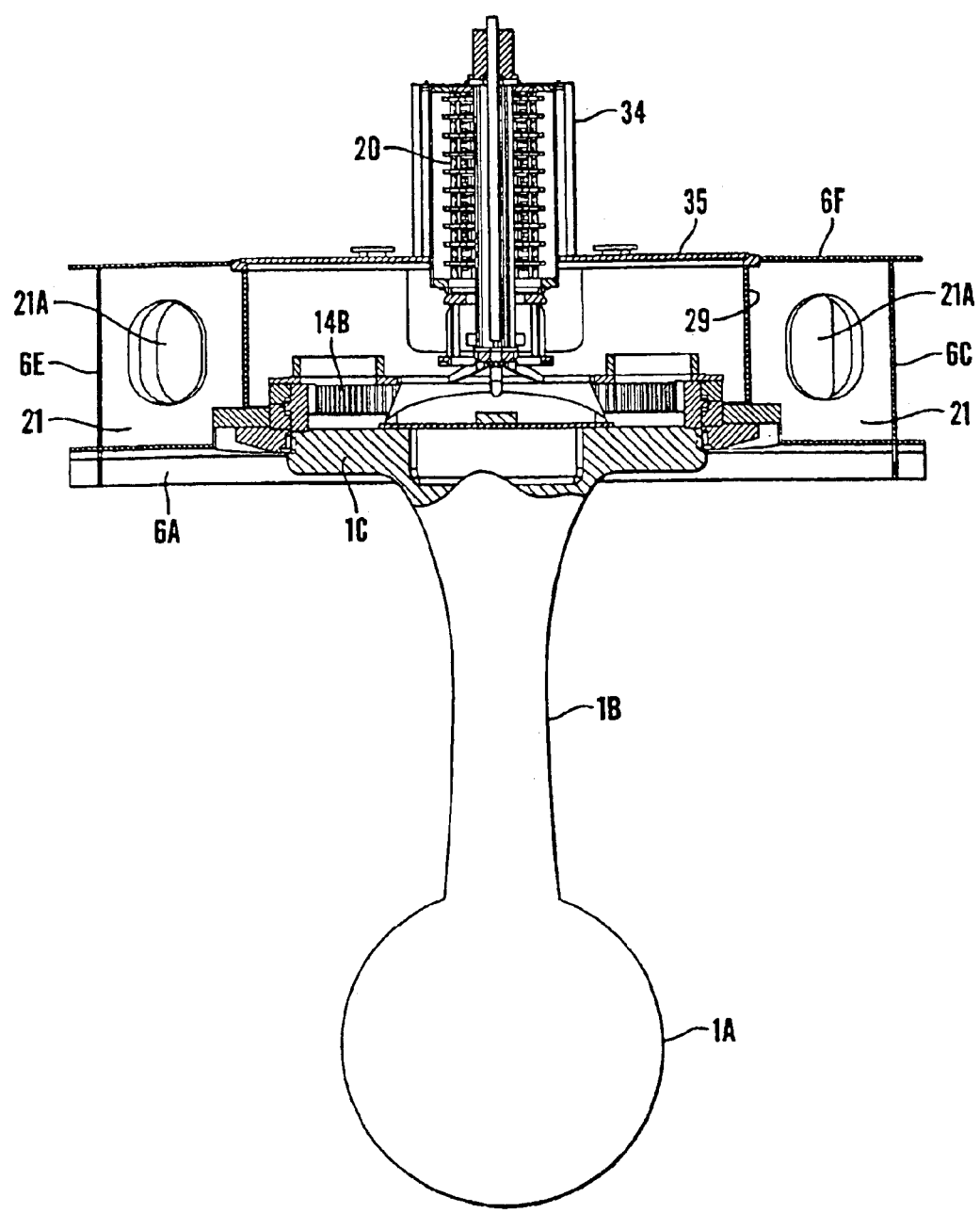
FIG. 4 shows a cross section in the latitudinal direction of the embodiment according to FIG. 2.

FIG. 4 is a cross sectional view in the latitudinal direction, in relation to the extension of the ship, of a device of the invention according to FIG. 2, and as can be seen, a number of stays 21 with through-holes 21A are provided inside the seating between a drum 29 and the side walls 6B–E enabling air circulation within the very seating. The upper portion of the seating is limited by a plate 6F, which often is the floor board (see FIG. 6). Said plate constitutes an upper limitation surface for the circulation of cooling air inside the seating. Further, a cover 35 is shown, which delimits the airflow at the upper end of the drum 29. For the same purpose, there is a cap 34, which is sealingly arranged around the slip-ring device 20. Concerning the other details, reference is made to the above description relating to the previous figures.

Figure 5A:
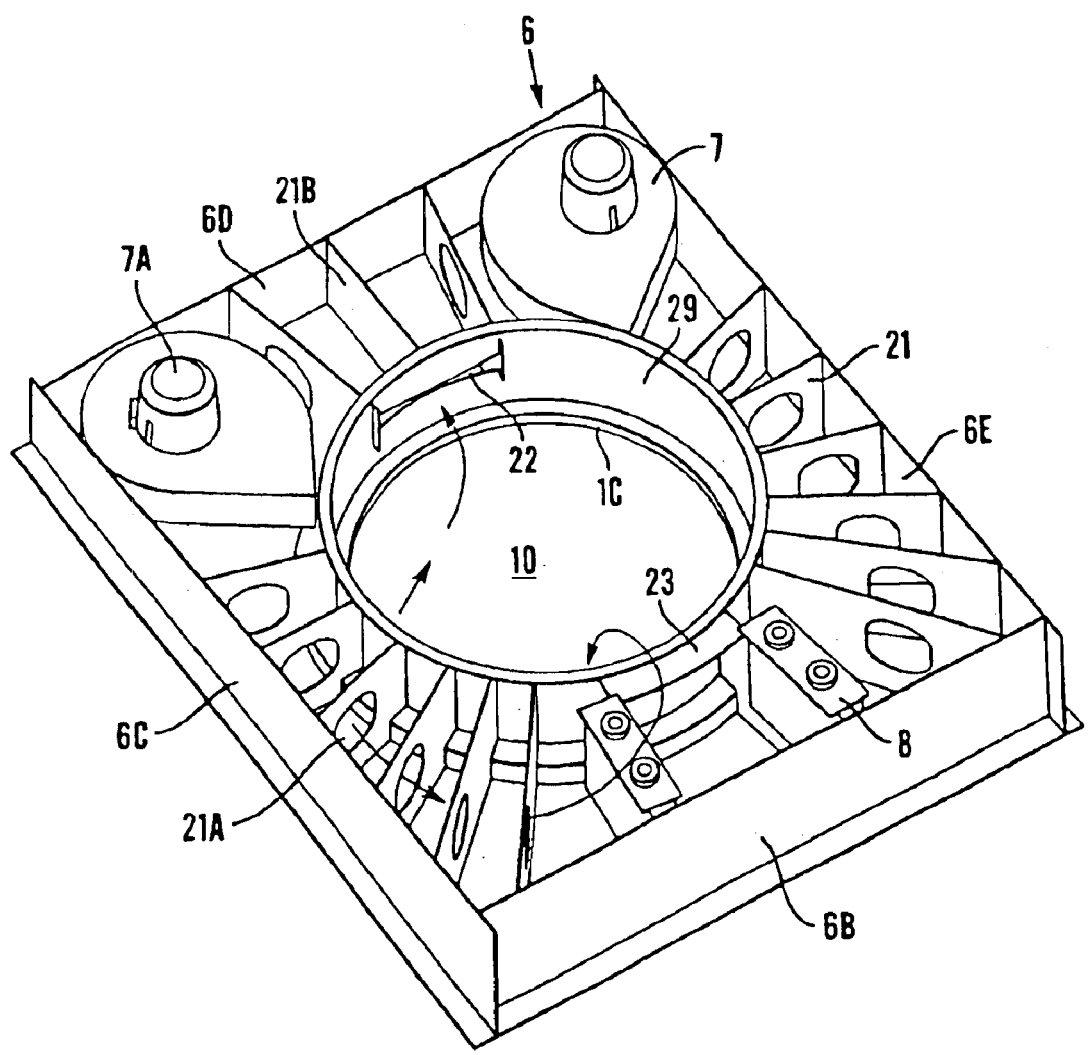
FIG. 5A shows essential portions of a seating according to the invention, obliquely from above.

In FIG. 5A, in a view obliquely from above (with the plate 6F taken off), essential portions of the very seating 6 are shown. It can be seen that two fans 7 with engines 7A are suitably used as well as two cooling units 8. As already mentioned, there is a plurality of stays 21 inside the seating. Said stays are arranged between respective side walls 6B, 6C, 6D, 6E and the coaxial cylindrical drum 29. As the outer walls 6B–6E of the seating are rectangularly arranged, the stays 21 get different lengths. Air holes 21A are centrally arranged in said stays 21. Further, there is an inlet opening 23 in the centrally located drum 29, which opening is facing the rear wall 6B of the seating. In the opposite wall of the drum 29 there is an outlet opening 22. Straight in front of said outlet opening there is a stay 21 B without holes. Depending on said design of the seating, air flow paths are created with enables air to enter through the inlet opening 22, to pass through the holes 21A in the first stay 21 and to reach a fan 7, whereafter the air is circulated further through an additional hole 21 A in the subsequent stay 21 in order then to be cooled by the cooling devices 8, and thereafter the cooled air may finally flow into the inlet opening 23 and down through the inlet duct 10. In order to cool the pod motor 2 in the pod housing in this way, it is an advantage that the pod housing is mounted far inside the seating, so that the cooling air may be carried down through the pod housing to the pod motor 2 for its cooling without any requirements for any additional building height.

Figure 5B:
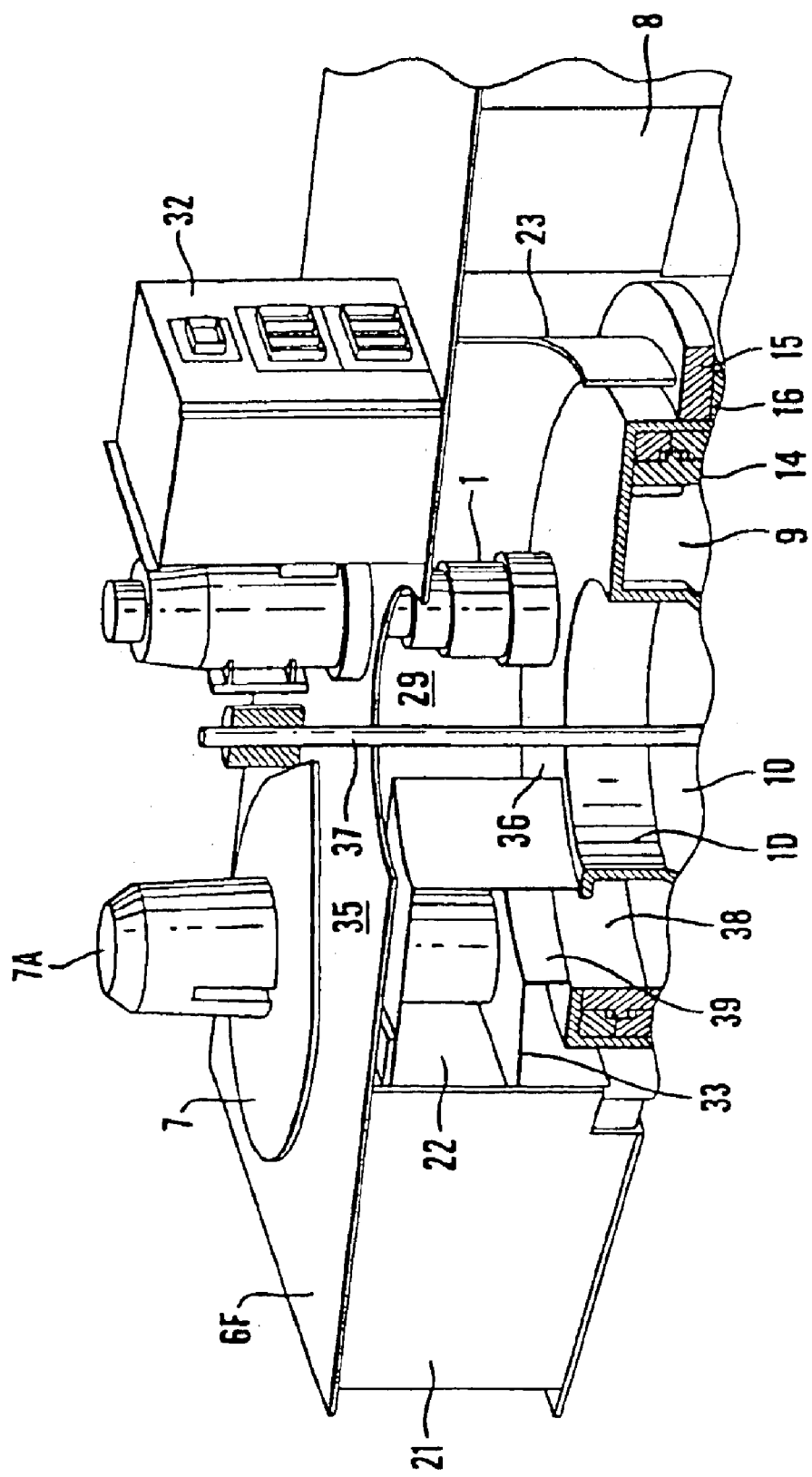
FIG. 5B shows a seating with a pod housing in a cross sectional and perspective view.

In FIG. 5B there is shown more in detail how the air circulation between seating and pod housing is achieved. It is necessary that the hot air coming up through the return duct 9 is not mixed with the cooled air which is forced down through the inlet duct 10 down to the pod motor 2. For this reason the central upper portion of the pod housing is provided with a cylindrical extension 1D, the outer surface of which delimits an annular space 38. Upwards and outwards, at the sides, said annular space 38 is delimited by a cover means 36, which is fixedly connected to the base 15 through the bearing sockets 19. Sealing are arranged between said cover means 36 and the movable portions of the pod housing 1 to prevent air transmission. Further, there is an L-shaped air duct 39 which carries air from the annular duct 38 to the inlet opening 22 of the drum 29. When cooling air has passed through respective fan 7 and respective cooling element 8, air is re-introduced through the inlet opening 23 and then above the cover means 36, so that the air is carried downwards through the cooling air duct 10 inside the pod housing 1. In order to make the figure more distinct, only the shaft 37 to the slip-ring means 20 is shown. For this reason the cap 34 is not shown either.

Thanks to the low height necessary for the installation of the pod housing inside the seating, it may also be possible to place the cooling equipment inside the very seating and to carry the air downwards to the pod motor through the pod housing without additional construction height. Hereby the cooling efficiency is also improved, as the air is cooled through a heat exchange against the bottom surface 6A of the seating. Thus, improved cooling as well as lower construction height are gained, i.e. less space is required upwards inside the hull. An additional advantage is that the cooling equipment (fans, coolers, etc.) are integrated within the seating, which then can be finished in plant premises, which implies a more efficient and highly qualitative performance. Also the assembly with the hull, in shipyards, can be performed more rapidly due to the fact that more units are integrated inside the module units. The seating with a fan system is welded to the hull. Thereafter, the finished pod housing with the steering engine may be mounted from below without any subsequent complicated connection to the fan system as well as without any further machining thanks to the installation fan 16.

Figure 6:
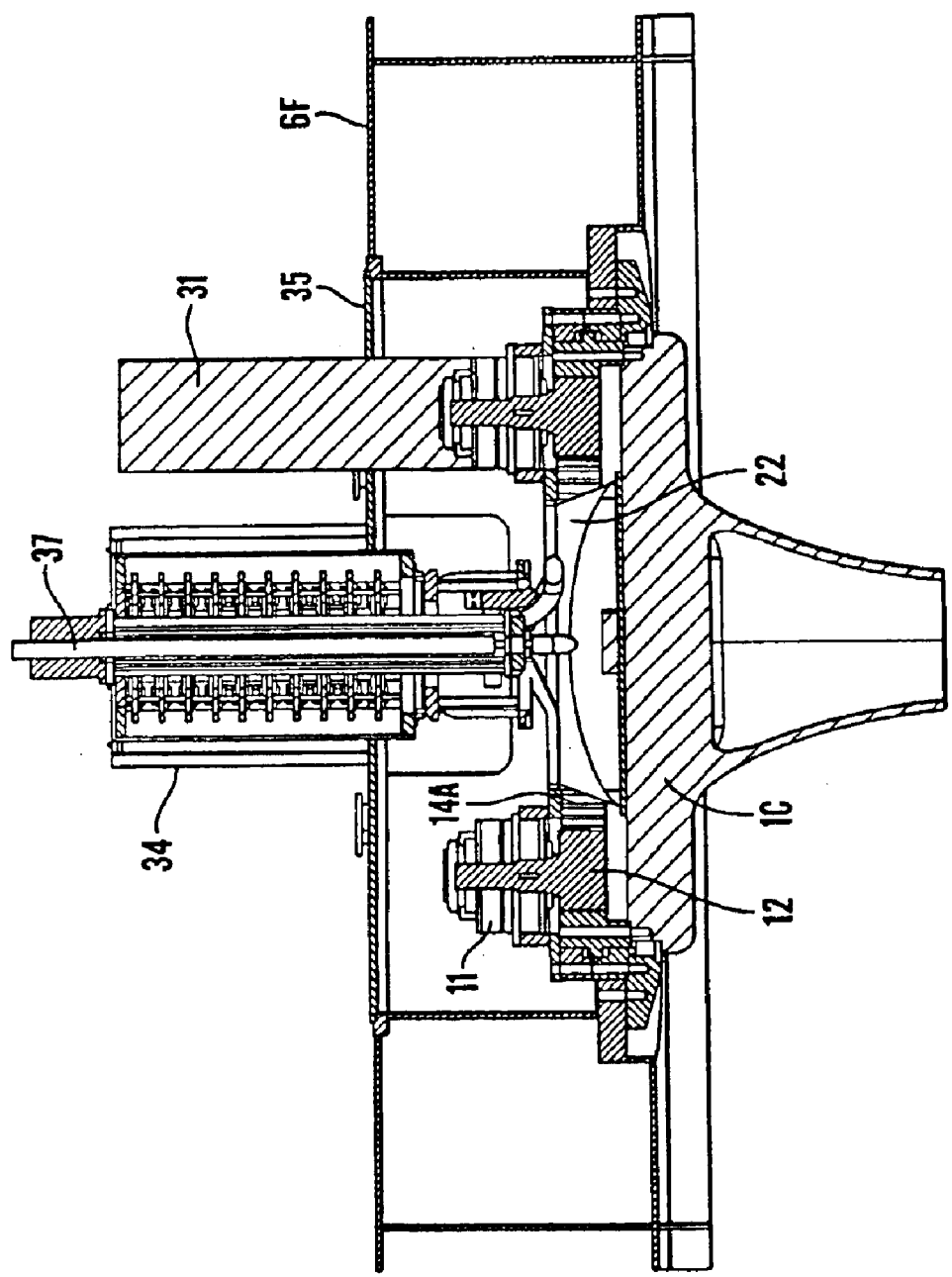
FIG. 6 shows a view from above of a seating with a pod unit installed inside thereof according to the invention.
Figure 7:
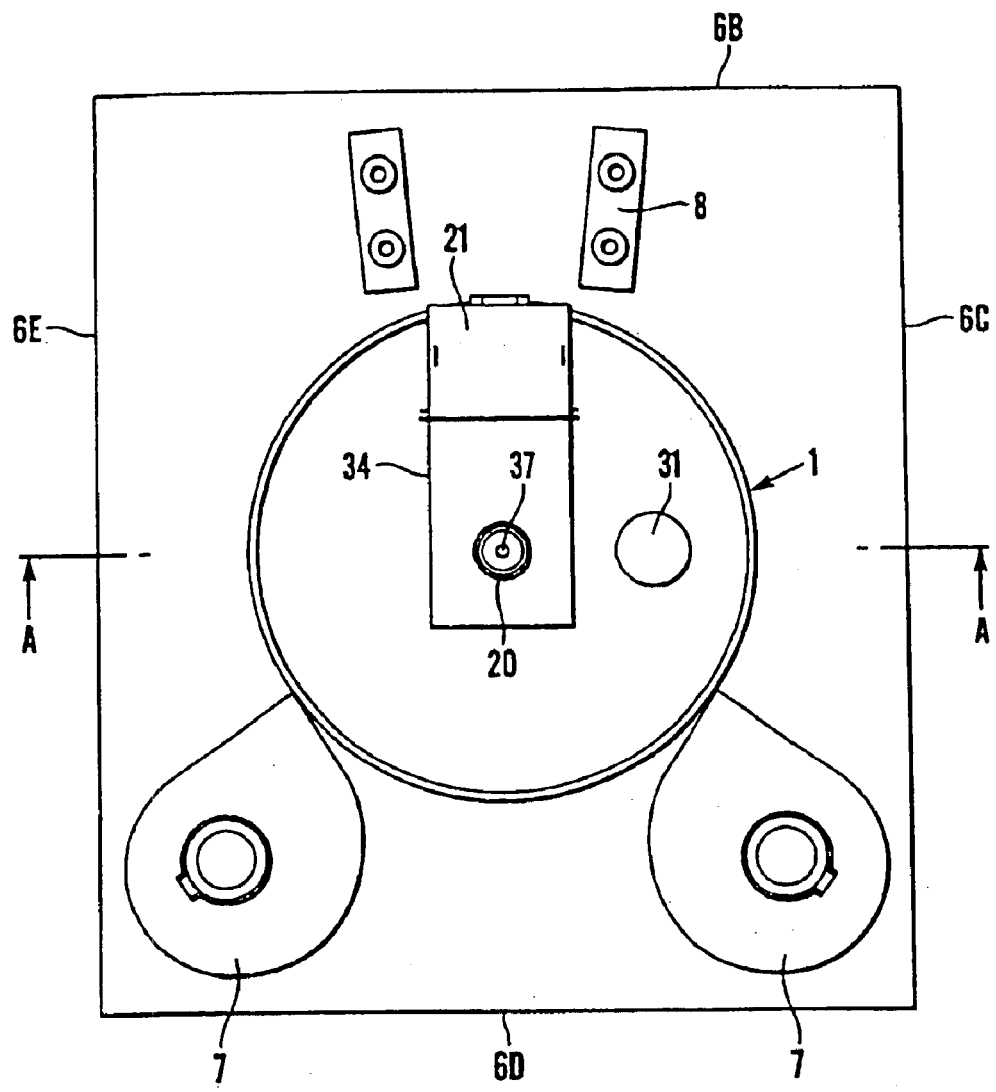
FIG. 7 shows a more detailed view of the upper portion of a pod unit according to FIG. 4.

FIG. 7 shows a view from above of a seating according to the invention with a pod housing 13, slip-ring device 20 and a driving unit 31, which details are presented schematically. In said figure, also the cross section A—A is shown, which is the basis of FIG. 6. In principle the same details are shown in FIGS. 6 and 7 as those already described with reference to FIGS. 2 and 3. In addition there is, however, shown, that there is a possibility to use an electric motor 31 for the operation of the gear ring 14 instead of using an hydraulic motor 11, which is the conventional manner. There are several advantages to use an electric motor. Firstly, a hydraulic motor 11 is comparatively expensive in relation to an electric motor. Further, the hydraulic motor requires that a base for the hydraulic pump, valves, etc. is provided at the side of the pod unit for operation of the hydraulic motor. Thanks to the high construction height of the slip-ring device 20 (often more than 2 m above the gear ring) will it be possible to give space to an electric motor 31 beside the slip-ring device, which motor is located with its driving shaft in the vertical line, which eliminates the need of a base at the side of the seating. By means of operation by an electric motor additional details in connection with the installation of a pod unit may thus be eliminated, while the costs are reduced. In order to obtain a suitable rotational speed of the gear ring, a transmission unit should, however, be provided between the outlet axis of the electric motor and the gear ring, suitably a gear transmission is used.

The invention is not limited to the above description but may be varied within the scope of the accompanying patent claims. For instance, it should be understood that the driving of the electric motor, FIGS. 6–7, also may be applied in connection with a conventional installation of a pod unit, and that it will be possible to gain great advantages also when a conventional installation is concerned. Further, it is realized that it is not necessary to use an intermediate mounting flange 16 to utilize the advantages according to the invention, as, also with a conventional installation, i.e. with the bearing socket 19 for the gear ring 14 connected directly to the base 15, many advantages according to the invention are obtained. The advantages according to the invention are also obtained even with a seating having another exterior cross section than a rectangular, e.g. an oval or a cylindrical one. The cooling elements may in certain cases, especially if the plate 6F is the floor board, advantageously be located at the air inlet 22 to the seating 6 in order to keep the temperature of the plate 6F down for comfort reasons. Insulation may, however, be utilized to obtain said object. Further, it should be understood that the cooling system in certain cases may be arranged without special cooling elements, if the cooling of the air during the passage through the seating (for instance when it is the question of long flow paths) as such is sufficiently efficient in connection with heat exchange against the lower surface of the seating, the other side of which being in direct contact with the water. Further, it should be understood that said drum 29 need not have a circular shape but can fulfil its function as load carrying unit and as a portion to delimit a certain space for air circulation also in other shapes, for instance a rectangular or oval shape.

Additionally, it should be realized that the construction may easily be adapted so that the pod unit can be mounted and demounted while the ship floats. The drum 29 and the cover 34 are then designed in a waterproof manner, for instance through screw joints and rubber sealings. The mounting flange 16 is preferably provided with three attachment ears (according to known technique per se for installation of rotatable thrusts) for mounting wires, which attachment ears are suitably sealed against the hull, so that the wires can be attached from the inside of the ship. In this way the working hours for divers are reduced.

What is claimed is:

1. An assembly unit for a pod housing to rotateably install the pod housing to the hull of a ship, the assembly unit comprising a lower wall and an upper wall which are connected to each other by means of side outer walls, to form a box like assembly unit, wherein said box like assembly unit is arranged to be fixedly attached to the hull of a ship, to form a seating, a base fixedly attached within the space delimited by said box like assembly unit, said pod housing being rotateably arranged by means of a bearing unit that is attached on to said base, and wherein a cooling system comprising at least a fan is mounted within said box like assembly unit, within a space between the base and the outer walls of said box like assembly unit.

2. An assembly unit according to claim 1, wherein at least one cooling unit is installed within said space.

3. An assembly unit according to claim 1, wherein a drum is positioned inside the seating, which forms an inner delimitation of said space, which drum is arranged with an inlet opening and an outlet opening, respectively, for cooling air.

4. An assembly unit according to claim 3, wherein said drum is positioned coaxially to said base.

5. An assembly unit according to claim 4, wherein stays with holes are provided between said drum and said side walls, said stays transmitting cargo and also enabling transport of air.

6. A pod unit according to claim 1, wherein said base is provided nearer the lower wall of the seating than the upper wall of the seating.

* * * * *